United States Patent [19]

Mitsutake

[11] Patent Number: 5,429,164
[45] Date of Patent: Jul. 4, 1995

[54] CAP-AND-BASE TYPE PNEUMATIC TIRES

[75] Inventor: Toshiyuki Mitsutake, Sayama, Japan

[73] Assignee: Bridgestone Corporation, Tokyo, Japan

[21] Appl. No.: 67,981

[22] Filed: May 27, 1993

[30] Foreign Application Priority Data

May 28, 1992 [JP] Japan .................. 4-162106

[51] Int. Cl.6 .................................... B60C 11/00
[52] U.S. Cl. .................. 152/209 A; 152/209 R
[58] Field of Search .............. 152/209 R, 209 A, 532

[56] References Cited

U.S. PATENT DOCUMENTS 3,486,545 12/1969 Niclas et al. .
3,853,164 12/1974 Mirtain ..................... 152/209 R
5,109,902  5/1992 Kobayashi ................. 152/209 R

FOREIGN PATENT DOCUMENTS 0370724  5/1990  European Pat. Off. .
2184469 12/1973 France .
2184484 12/1973 France .
162104   6/1990  Japan ...................... 152/209 A
753963   8/1956  United Kingdom .

OTHER PUBLICATIONS

Patent Abstracts of Japan, vol. 12, No. 448 (M-768) 24 Nov. 1988.

Primary Examiner—Geoffrey L. Knable
Attorney, Agent, or Firm—Sughrue, Mion, Zinn, Macpeak & Seas

[57] ABSTRACT

A pneumatic tire including a tread portion provided with a foamed rubber layer made of a foamed rubber and an outer rubber layer made of a non-foamed rubber and arranged radially outwardly of the foamed rubber layer to contact roads. The radially thickness of the outer rubber layer is gradually increased from one end of the tread portion to the other end.

6 Claims, 1 Drawing Sheet

CAP-AND-BASE TYPE PNEUMATIC TIRES

BACKGROUND OF THE INVENTION

1. Field of the Invention

The present invention relates to cap-and-base type pneumatic tires provided with two rubber layers composed of a non-foamed rubber and a foamed rubber, respectively, in a tread portion.

2. Related Art Statement

A variety of pneumatic tires have been proposed, which have excellent performance on ice and snow roads (hereinafter referred to as "ice and snow performance"). That is, they exhibit excellent driving performance, braking performance and cornering stability during running on ice and snow roads and which can prevent occurrence of dust during running on dry roads. For example, a pneumatic tire having a foamed rubber layer containing closed cells and arranged in a treading surface portion of a tread is known.

However, since the treading surface portion of the tread of such a conventional pneumatic tire is entirely constituted by a foamed rubber having low rubber hardness (low rigidity), the treading surface portion is largely deformed during running under load. As a result, the tire has a problem in that the tread portion of the tire is worn out at an early stage through running on dry roads.

SUMMARY OF THE INVENTION

It is an object of the present invention to provide a pneumatic tire which can improve its wear resistance, while maintaining ice and snow performance at a practical levels.

The above object can be accomplished by the pneumatic tire including a tread portion provided with a foamed rubber layer made of a foamed rubber and an outer rubber layer made of a non-foamed rubber and arranged radially outwardly of the foamed rubber layer to contact roads, wherein the thickness of the outer rubber layer is gradually increased as the outer rubber layer extends from one end of the tread portion to the other end.

According to the pneumatic tire of the present invention, only the outer rubber layer contacts road surfaces during an initial wearing stage. However, since grooves, sipes and the like are formed in the outer rubber layer as known to the skilled person in the art, ice and snow performance is maintained to a practically sufficient level. In addition, though only the outer rubber layer contacts the road surfaces during the initial wearing stage as mentioned above, this outer rubber layer is made of a non-foamed rubber having relatively high rubber hardness. Accordingly, wear resistance of the tire is so high that the tire can run on dry roads over a sufficiently long distance. Then, when this pneumatic tire enters a wearing middle stage, the outer rubber layer is worn out to some degree over an entire width, and consequently the grooves, the sipes or the like become shallower and begin to largely deteriorate the ice and snow performance. However, since the radial thickness of the outer rubber layer is gradually increased as it extends from one end of the tread to the other end, the outer rubber layer near this one end of the tread is completely worn out in this wearing middle stage. Consequently, an inner portion of the foamed rubber layer is partially exposed to outside. Since voids in the foamed rubber layer serve to provide escape for water film formed on a ice/snow road during running on the ice/snow road, so that deterioration in the ice and snow performance can be prevented, and the ice and snow performance can be maintained to practically allowable levels. At that time, since the outer rubber layer is retained on a side near the other end of the tread, the wear resistance can be maintained to a considerably high level as compared with the conventional tires, although slightly deteriorated. As mentioned above, according to the present invention, ice and snow performance and wear resistance can be well exhibited over the wear initial to the middle stages thereof.

These and other objects, features and advantages of the invention will be appreciated upon reading of the description of the invention when taken in conjunction with the attached drawing, with the understanding that some modifications, variations and changes of the same could be easily made by the skilled person in the art to which the invention pertains without departing from the spirit of the invention or the scope of claims appended hereto.

BRIEF DESCRIPTION OF THE ATTACHED DRAWING

For a better understanding of the invention, reference is made to the attached drawing, wherein:

FIG. 1 is a sectional view of an embodiment of a pneumatic tire according to the present invention taken along with a meridian line.

DETAILED DESCRIPTION OF THE INVENTION

Figure 1:
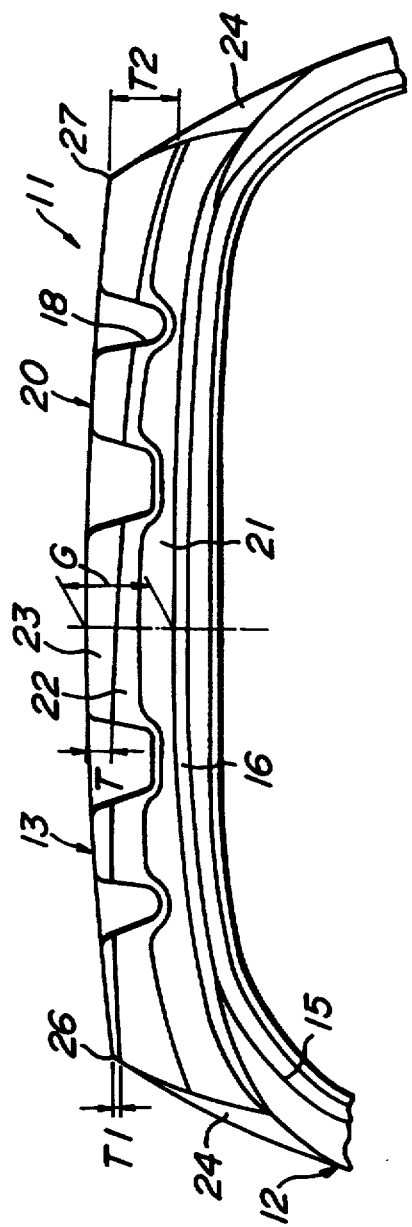

One embodiment of the pneumatic tire according to the present invention will be explained on the basis of the attached drawing.

Turning to FIG. 1, a pneumatic tire 11 includes a pair of sidewalls 12 extending substantially outwardly in a radial direction from a pair of respective bead portions not shown, and an almost cylindrical tread portion 13 connecting radially outer ends of these sidewalls 12. These sidewalls and the tread portion are reinforced by a toroidal carcass layer 15 extending from one bead portion to the other. The carcass layer 15 is turned up around the bead portion from an axially inner side to an axially outer side at each of widthwise opposite ends, and a number of organic fiber cords are buried in the carcass layer such that the cords extend in meridian directions (radial directions). A belt layer 16 is arranged in the tread portion 13 on a radially outer side of the carcass layer 15, and a number of non-expandable cords such as steel cords are buried in the belt layer 16. A tread 20 is arranged on a radially outer side of the belt layer 16, and grooves 18 such as main grooves and lateral grooves as well as sipes (not shown) are formed on a treading surface of the tread portion 20 in the same way as in the ordinary tires.

The tread 20 includes a base rubber layer 21 contacting the belt layer 16 on a radially inner side. This base rubber layer is composed of a non-foamed rubber having relatively high rubber hardness. A foamed rubber layer 22 and an outer rubber layer 23 are arranged on a radially outer side of the base rubber 21. The foamed rubber layer 22 is composed of a foamed rubber having a number of closed cells inside. On the other hand, the outer rubber layer 23 is arranged on a radially outer side of the foamed rubber layer 22 so that the outer rubber layer 23 may contact road surfaces. The outer rubber layer 23 is composed of a non-foamed rubber such as a rubber for ice use. The foamed rubber constituting the foamed rubber layer 22 is obtained by adding a blowing agent to an ordinary rubber composition and heating the resulting mixture under pressure according to the ordinary tire-producing process. When the base rubber layer 21 composed of non-foamed rubber is arranged on the radially inner side of the foamed rubber layer 22 as mentioned above, the rigidity of the foamed rubber 22 becomes greater to some extent upon receipt of influence from the base rubber layer 21 having relatively high hardness. Consequently, the deformation of the tread is suppressed during running under load, so that cornering stability is improved. Each of the opposite sides of the tread 20 is covered with a side rubber 24, which is composed of a non-foamed rubber having excellent bending resistance and cut resistance.

Since the outer rubber layer 23 to contact ice/snow roads is provided with the grooves 18 and the sipes as mentioned above, the ice and snow performance of the tire 11 exhibits a practically sufficient level in the wearing initial stage, although lower than the levels of the foamed rubber. On the other hand, since the outer rubber layer 23 contacting the road surfaces is composed of the non-foamed rubber having relatively high rubber hardness, the wear resistance of the tire 11 is sufficiently high even when the tire 11 runs on dry roads. When such a tire 11 is worn and enters the wearing middle stage, the outer rubber layer is worn out to some extent over an entire widthwise direction. In the case of ordinary tires, since the depths of the grooves 18 and the sipes become smaller, and the ice and snow performance begins to be largely deteriorated, so that running on the ice and snow roads become difficult.

In view of the above, according to the embodiment of the present invention, the radial thickness T of the outer rubber layer 23 is gradually increased as it extend from one end 26 of the tread (the end of the tread to be located on an inner side of a vehicle in this embodiment when mounted thereon) to the other end 27 (the end of the tread to be located on an outer side of the vehicle when mounted thereon). Since the radial thickness G of the tread 20 (a distance from a radially outer side of the belt layer 16 to a radially outer surface of the tread 20) is almost constant at every location, the thickness of the foamed rubber layer 22 is gradually decreased as the foamed rubber layer 22 extends from the radial one tread end 26 to the other tread end 27. When the radial thickness T of the outer rubber layer 23 is increased as it extends toward the other tread end 27, the outer rubber layer 23 on a side near the one tread end 26 is worn out in the middle wear stage. Consequently, a portion of the foamed rubber layer 22 on the side near the one tread end 26 becomes visible at the tread surface. A number of the closed cells in the exposed foamed rubber layer function to escape a water film on a ice and snow road during running on the ice and snow, so that even though the ice and snow performance of the outer rubber layer are largely deteriorated as mentioned above, the enhanced ice and snow performance due to the exposed foamed rubber layer 22 offsets the above deterioration in the ice and snow performance. Consequently, the ice and snow performance can be maintained to a practically allowable level. Further, since the outer rubber layer 23 is retained on the side near the other tread end 27 during the middle wearing stage, considerably high wearing resistance can be still maintained even on running on dry roads as compared with the conventional tires, although the wear resistance is slightly deteriorated as compared with the wearing initial stage. In this manner, the ice and snow performance and wear resistance can be excellently exhibited in a well-balanced fashion over a period from the initial wearing stage to the middle wearing stage in the case of the tire 11 of this embodiment.

According to the present invention, it is preferable that the radial thickness T1 of the outer rubber layer 23 at the one tread end 26 is not more than 5% of the radial thickness G of the tread 20 at the axial center of the tread, and that the radial thickness T2 of the outer rubber layer 23 at the other tread end 27 is not less than 50% of that G of the tread 20 at the axial center thereof. The reason is that if the radial thickness T1 of the outer rubber layer 23 at the one tread end 26 is more than 5% of that G of the tread 20 at the axial center of the tread, an exposed surface area of the foamed rubber layer 22 becomes small in the wearing middle stage so that the ice and snow performance is likely to become more deteriorated than in the wearing initial stage. If the radial thickness T2 of the outer rubber layer 23 at the other tread end 27 is less than 50% of that of the tread 20 at the axial center, the road-contacting area of the outer rubber layer 23 in the wearing middle stage becomes smaller so that wearing resistance is likely to be largely lowered.

When the tire 11 is turned during cornering, the vehicle is tilted due to centrifugal forces so that a larger load is applied to a portion of the tread which is located on a side more spaced from a center of the vehicle as viewed in a widthwise direction thereof, assuming that the tread 20 of the tire 11 is binarily divided into two portions along the axial center of the tread. Thereby, a portion of the tread 20 of the tire 11 located on the widthwise outer side of the vehicle will be worn in an earlier stage as compared with the other portion of the tread located on the widthwise inner side of the vehicle. For this reason, a fitting direction of the tire 11 of this embodiment is specified so that the one tread end 26 is to be set on the widthwise inner side of the vehicle, whereas the other tread end 27 is to be set on the widthwise outer side of the vehicle. By so setting, a portion of the outer rubber layer 23 made of the non-foamed rubber having high wear resistance, has a greater radial thickness T, is to be located on the widthwise outer side of the vehicle. Thus, the service life of the tire 11 is prolonged.

Next, experimental examples will be explained. In this experiment, a conventional tire having a tread composed of a base rubber layer and a foamed rubber layer arranged on a radially outer side of the base rubber layer as well as a test tire as shown in FIG. 1 were prepared. The size of each tire was 195/75 R 14. Next, the tire was inflated at an internal pressure of 2.4 kg/cm$^2$, and was fitted to a passenger car having a displacement of 3,000 cc. The car was run at a speed of 40 km/h on ice at an atmospheric temperature of −5° C., and then braked hard. Ice and snow performance was evaluated through measurement of a braked distance required for the tire to stop from a point where the car began to be braked. Results were expressed by index by taking that of Comparative tire as 100. The ice and snow performance of Test tire was 95 by index, which was a practically sufficient value. The index 100 corresponded to 50 m. Further, the passenger car with each of the above tires was run on a paved general road over 10,000 km, and then the depth of a groove remaining after the completion of the running was measured. Wear resistance of each of the tires was determined by index by taking that of Comparative Tire as 100. The index of Test tire was 120, which showed largely improved wear resistance. The index 100 corresponded to 2.8 mm. Furthermore, each type of the above tires was run on a drum at a speed of 30 km/hr, while a vertical load of 300 kg and a lateral load of 250 kg were being applied to the tire. The cornering stability was determined by measuring the cornering power of the tire at that time. It was revealed that a result of Test tire was 105 by index, when that of Comparative tire was taken as 100, and that the cornering stability of Test tire was slightly more excellent than that of Comparative tire.

Moreover, the ice and snow performance, the wear resistance, and the cornering stability were determined with respect to each of the above tires on a wearing middle stage. As a result, it was revealed that when each of these ice and snow performance, wear resistance and cornering stability of Comparative Tire was taken as 100, the ice and snow performance, the wear resistance, and the cornering stability of Test tire were 98, 110 and 105, respectively. As is seen, although the wear resistance of Test tire was slightly lower in the wearing middle stage than in the wearing initial stage, the ice and snow performance was improved. Thus, it is understood that both the wear resistance and the ice and snow performance were realized in the present invention. The ice and snow performance, the wear resistance, and the cornering stability corresponding to the index 100 were 50 m, 2.8 mm, and 50 kg/deg., respectively.

As having been explained above, according to the present invention, the wear resistance can be improved, while the ice and snow performance is maintained to a practically acceptable level.

What is claimed is:

1. A pneumatic tire including a tread portion which comprises; a foamed rubber layer made of a foamed rubber and an outer rubber layer made of a non-foamed rubber and arranged radially outwardly of the foamed rubber layer to contact roads, wherein a radial thickness of the outer rubber layer is gradually increased from one end of the tread portion to the other end.

2. The pneumatic tire as set forth in claim 1, wherein a radial thickness of the outer rubber layer at one end of the tread is not more than 5% of a radial thickness of the tread at an axial center thereof, whereas a radial thickness of the outer rubber layer at the other end of the tread is not less than 50% of the radial thickness of the tread at the axial center thereof.

3. The pneumatic tire as set forth in claim 1 further comprising a base rubber layer composed of a non-foamed rubber and arranged radially under said foamed rubber layer.

4. The pneumatic tire of claim 1 wherein said foamed rubber layer comprises a foamed rubber having a number of closed cells formed by adding a blowing agent to a rubber composition and heating.

5. The pneumatic tire of claim 1 further comprising side rubber strips at opposite ends of said tread portion, said side rubber strips composed of a non-foamed rubber.

6. The pneumatic tire of claim 1, wherein a radial thickness of said foamed rubber layer gradually decreases from said one end of the tread to said other end.

* * * * *